United States Patent
Krause et al.

[11] Patent Number: 5,321,228
[45] Date of Patent: Jun. 14, 1994

[54] NOZZLE FOR THE SURFACE TREATMENT OF METAL WORKPIECES

[76] Inventors: Andreas Krause, Friedrich-Hegel-Str. 38, 8027 Dresden; Andreas Uelze, Martin-Anderson-Nexö-Str. 34, 8020 Dresden; Reinhard Becker, Reisewitzer Str. 13, 8028 Dresden, all of Fed. Rep. of Germany

[21] Appl. No.: 952,508
[22] PCT Filed: Jun. 23, 1992
[86] PCT No.: PCT/CH92/00119
§ 371 Date: Dec. 8, 1992
§ 102(e) Date: Dec. 8, 1992
[87] PCT Pub. No.: WO93/00171
PCT Pub. Date: Jan. 7, 1993

[30] Foreign Application Priority Data
Jun. 24, 1991 [DE] Fed. Rep. of Germany ....... 4120790

[51] Int. Cl.$^5$ ................................................ B23K 26/14
[52] U.S. Cl. ........................... 219/121.84; 219/121.64; 372/701
[58] Field of Search ................... 219/121.63, 121.64, 219/121.84, 121.74, 121.6, 121.85; 427/596, 597; 372/701

[56] References Cited

U.S. PATENT DOCUMENTS 4,724,299 2/1988 Hammeke ............... 219/121.84 X
4,804,815 2/1989 Everett ..................... 219/121.6

*Primary Examiner*—C. L. Albritton
*Attorney, Agent, or Firm*—Townsend and Townsend Khourie and Crew

[57] ABSTRACT

The invention relates to a nozzle for the surface treatment of metal workpieces, in particular for the powder build-up welding or thin-layer alloying of highly stressed metal components, which can be selectively connected to a mirror-focused or a lens-focused high-energy beam installation, preferably a high-performance laser installation, by using the cooling medium units, inert gas lines and powder conveyors/extractors provided. In comparison with known laser spray nozzles, the nozzle guarantees a directionally-independent coating of highly stressed metal components with a regular annular distribution of the stream of powder-delivery gas and inert gas supplied. With this a defined flow of powder material, which is made up of a determined quantity of powder and a determined percentage of delivery gas, is distributed via a special powder supply appliance, so that the apex of the outlet of the stream of powder-delivery gas represented as an inverted cone coincides with the defocused laser beam outside the nozzle, and there the melting on of the powder particles and thus the formation of a melting bath with little melting onto the substrate and thus the build-up welding process itself occur.

21 Claims, 1 Drawing Sheet

NOZZLE FOR THE SURFACE TREATMENT OF METAL WORKPIECES

BACKGROUND OF THE INVENTION

The invention relates to a nozzle in particular for the powder build-up welding or thin-layer alloying of highly-stressed metal components by means of a high-energy beam.

In laser coating and alloying, under the aspect of performing the operational steps regarding the supply of the filler metal to be applied to the workpiece and its laser beam treatment in a single operation, special importance is attached to the creation of a suitable arrangement with a good positioning facility of the laser beam and supply of the stream of powder-delivery gas.

To reduce directional dependency in laser-powder build-up welding, from the Tagungsband "Lasertechnik" BIAS/VDI—Bremen 1991, Page 442 onwards under the title "Aspekte des Laser-Spritzbeschichten" by R. Becker, C. Binroth and G. Sepold, are known several nozzle refinements with the objective of a quasi-central supply of powder. The multi-beam nozzle described there only permits a centering of the stream of powder-delivery gas with difficulty, with small differences in the flow pulses of the individual beams having a negative effect. The requirement of a very precise orientation of the partial flows, which is associated with considerable expenditure, also has a disadvantageous effect.

The centering of the stream of powder-delivery gas by means of the annular nozzle presented is not possible because of the unevenly distributed discharge of powder caused by the construction. The third refinement, in which an additional separate stream of gas deviates the stream of powder downwards towards the substrate, in fact guarantees a circular distribution of the powder, but is very sensitive to dirt accumulation. The powder particles become attached to the walls of the outlet apertures and result in disruptive turbulence in the gas stream and can completely clog the nozzle aperture.

The laser spray nozzle known from U.S. Pat. No. 4,724,299 consists of a nozzle body having a first and a second sealed-off part and a beam passage, which extends between them so that the laser beam enters into the passage, passes through the first part and exits through the second part. A housing encloses the second part so that an annular passage is formed and with the said beam passage a coaxial aperture is enclosed, which allows the laser to pass. There are also means which operate with this aperture so as to convey a powder so that this and the beam coincide at a common point.

From U.S. Pat. No. 4,804,815 discloses a nozzle similar to the solution described above, which also operates according to the principle of laser spray coating and which is used for the preventative surface treatment of nickel alloys.

As a result of their special use for the laser spray coating, the two nozzle constructions mentioned have the common failing that the consumption of scavenging gas, which sprays the molten particles on to the surface to be coated, is very high. The thermal stress on the structures at the powder outlet aperture is comparatively high, as the powder particles still coincide with the laser beam inside the nozzle and thus, the melting of the powder particles occurs in the nozzle and thermal radiation occurring directly stresses the spray nozzle outlet apertures. The necessary cooling circulation of the first nozzle increases the manufacturing costs.

Therefore the object of the invention is, with the removal of the above-mentioned shortcomings and contrary to the conventional methods of laser spray coating, to create a nozzle, in particular for the laser-powder build-up welding or thin-layer alloying, which guarantees a directionally independent coating of highly-stressed metal components with the regular, annular distribution of the flow of powder material and inert gas supplied. It will be possible to connect the nozzle, as an important addition to the selection of tools already available, with few manipulations to commercially available high-performance laser installations, for example.

SUMMARY OF THE INVENTION

This object is achieved by providing a laser duct through which a laser beam passes, and several powder guide ducts. The powder guide ducts have an outlet aperture which is directed towards a point through which the laser beam passes. With the nozzle according to the invention, which may selectively be connected to a mirror-focused or lens-focused high-power laser installation, is distributed a defined stream of powder material, which is composed of a determined quantity of powder and a determined percentage of delivery gas, via a special powder supply described in further detail below, so that the point of the outlet of the powder-delivery gas stream shown as an inverted cone coincides with the defocused laser beam outside the nozzle. There the melting on of the powder particles occurs and thus the formation of a melting bath occurs with little melting onto the surface of the workpiece and thus the build-up welding process itself occurs. The annular distribution of powder guarantees a plane coating in the entire x-y plane with an improvement in the surface quality and properties and the optimization of the abrasion behaviour of the respective component. The chambers produced after the assembly of the nozzle between the laser beam guide part, the powder guide cap, the inert gas supply cap and the inert gas cap and metal-metal connections ensure the heat dissipation of the heat reflected from the melting bath right up to the water cooling and thus the thermal protection of the nozzle during laser-powder build-up welding operation.

The angle of the truncated cones from the laser beam guide part, the powder guide cap, the inert gas guide cap and the internal conical surface of the inert gas cap to the imaginary center line may be roughly equal and lie between roughly 10° and 45°, and preferably between 28° and 40°. The number of powder guide ducts incorporated in the truncated cone of the powder guide cap may be roughly equal to the number of inert gas guide ducts incorporated in the truncated cone of the inert gas guide cap and lie between 4 and 40, and preferably between 15 and 28. The powder guide ducts may be 0.7 mm to 2 mm wide and 0.3 mm to 2 mm deep and in the upper region have a semi-circular distribution chamber. The stream of powder-delivery gas preferably flows via one or more straight, radial connections into the chamber between the powder guide gap and the inert gas guide cap. The inert gas guide ducts are advantageously 1 mm to 3 mm wide and 1 mm to 2 mm deep and in the upper region have a semi-circular distribution chamber. The inert gas is advantageously guided via two or more straight, radial connections into the nozzle and guided into the chamber between inert gas guide cap and inert gas cap. However the laser beam outlet aperture and the outlet apertures of the powder and inert gas guide ducts, which are disposed concentrically around it on rings, do not all have to be on one horizontal plane.

The angle α between the laser beam and powder ducts in the region of the outlet apertures, and the laser beam and inert gas ducts in the region of the outlet apertures, lies roughly between 10° and 45°, and advantageously roughly between 28° and 40'. In this region of their outlet apertures the ducts do not need to run parallel.

To protect the nozzle or individual parts thereof from excessive heating, one or more cooling medium duct(s) may be provided.

Therefore the invention relates to a nozzle for the surface treatment of metal workpieces, in particular for the powder build-up welding or thin-layer alloying of highly stressed metal components, which can selectively be connected to a mirror-focused or lens-focused high-energy beam installation, preferably a high-performance laser installation, by using the available cooling medium units, inert gas lines and powder conveyors/extractors. In contrast with known laser spray nozzles, the nozzle guarantees the coating of highly stressed metal components in which direction is not a factor, with a regular, annular distribution of the stream of powder-delivery gas and inert gas supplied. A defined stream of powder material, which is made up of a determined quantity of powder and a determined percentage of delivery gas, is distributed via a special powder supply appliance so that the apex of the powder-delivery gas outlet represented as an inverted cone coincides with the defocused laser beam outside the nozzle, and there the powder particles come to melt on and thus a melting bath is formed with little melting onto the substrate and thus the build-up welding process itself takes place.

An exemplified embodiment of the invention is represented in the drawings and will be described in further detail below.

DESCRIPTION OF THE PREFERRED EMBODIMENTS

Figure 1:
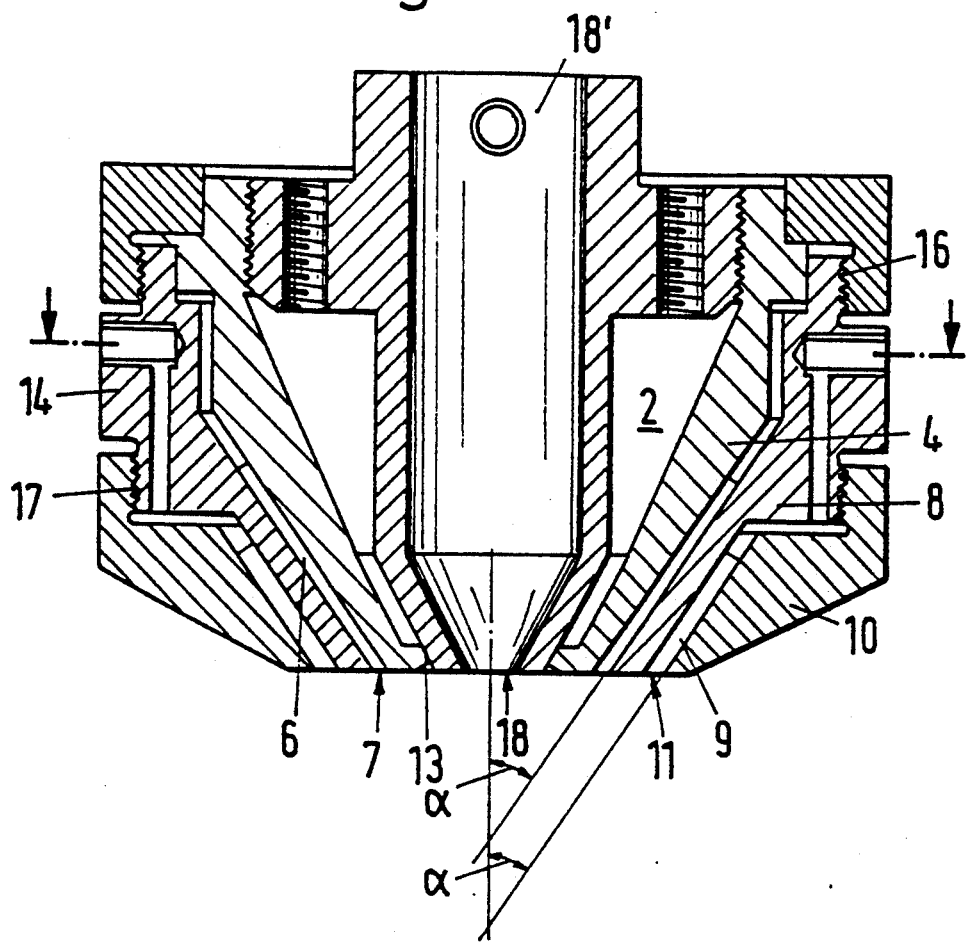
FIG. 1 shows a lateral view of the nozzle according to the invention as a diagrammatical representation.
Figure 2:
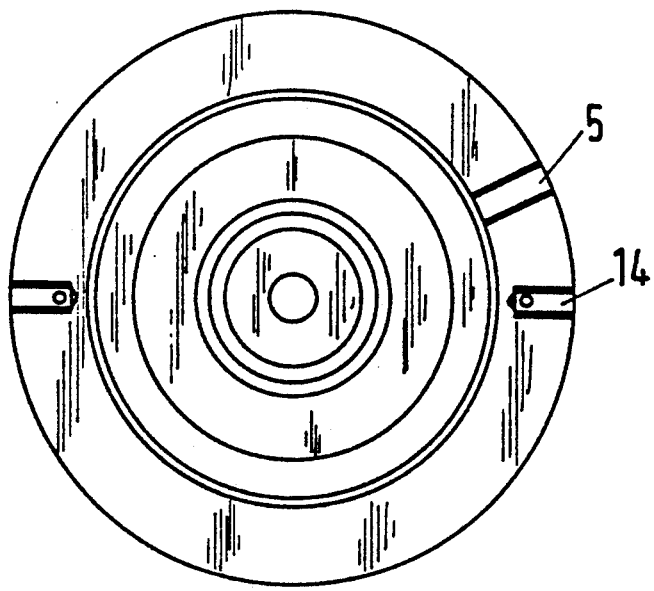
FIG. 2 shows a plan view of the nozzle with the connections for the stream of powder-delivery gas and the stream of inert gas.

It is assumed that the nozzle according to the invention shown in FIG. 1 and FIG. 2 for the surface treatment of a highly stressed metal workpiece for the laser-powder build-up welding operation is connected to a high-performance laser installation by using the available cooling medium units, inert gas lines and a powder conveyors/extractors via the internal diameter of its central laser beam guide part 1, which is constant in the upper region. The lower converging section of the laser beam guide part 1 is provided with a laser beam outlet aperture 18, but its upper flange-mounted annular part comprises cooling medium supply ducts and discharge ducts 3, which open into a water cooling chamber 1 and in the operational state perform the water cooling operation. The water cooling chamber 2 is on the one hand formed by the cylindrical and conical external contours of the laser beam guide part 1 and on the other hand by the internal contours of a powder guide cap 4, which are shaped like a truncated cone. In the tapering region it is sealed by means of sealing lip 13 formed at the end of the powder guide cap 4, which abuts the external contours of the laser beam guide part 1, and in the region which widens at the top by a positive locking between the laser beam guide part 1 and powder guide cap 4 by means of thread 1 on the ring part. Over the outer peripheral surface of the powder guide cap 4 shaped like a truncated cone in the lower section are uniformly distributed twenty-two powder guide ducts 6 having a width of 1 mm and a depth of 1 mm, corresponding to the angle of 35° fixed by the truncated cone to the imaginary center line of the nozzle, which guarantee a regular annular distribution of powder. The powder guide ducts 6 are limited with respect to the outside by the internal contours of an inert gas guide cap 8, so that with the same angle above them is created a clearance for the introduction and distribution of the stream of powder-delivery gas via at least one straight, radial connection 5. A positive and non-positive connection between both caps 4, 8 with the tight enclosure of the powder guide ducts 6 right to their outlet apertures 7 is achieved with the tightening of a coupling ring 15 by means of thread 16 on its stepped shoulder.

On the external surface of the inert gas guide cap 8 are disposed twenty regularly distributed inert gas guide ducts 9, also under an angle of 35° to the center line of the nozzle with a width of 2.5 mm and a depth of 1.5 mm.

The outer end of the nozzle according to the invention is formed by the inert gas cap 10, which is detachably connected to the inert gas guide cap 8 by means of thread 17. Because of the identical angle already mentioned, its conical internal contours surround the inert gas guide ducts 9 on all sides, so that their outlet apertures 11 also lie in one plane with the outlet apertures 7 of the powder guide ducts 6 and the laser beam outlet aperture 18. Above the inert gas guide ducts 9 there is in turn a minimal clearance, which is used for the introduction of the stream of inert gas via the connections 14 provided for this purpose and for the distribution into the inert gas guide ducts 9.

After the connection of the necessary mediums, such as inert gas, the stream of powder-delivery gas and cooling water, the arrangement according to the invention is ready for operation.

We claim:

1. A nozzle for supplying powdery welding material into a working area of a laser beam of a powder welding installation, comprising:
   a laser duct through which a laser beam passes, the laser duct having a longitudinal axis and a laser duct outlet aperture, the laser duct outlet aperture lying substantially in a first plane; and
   a plurality of powder guide ducts each having a first outlet aperture, the first outlet apertures of the plurality of powder guide ducts being directed at least approximately towards a point through which the laser beam passes and being positioned substantially on the first plane.

2. A nozzle for supplying powdery welding material into a working area of a laser beam of a powder welding installation, comprising:
   a laser duct through which a laser beam passes;
   a plurality of powder guide ducts each having a first outlet aperture, the first outlet apertures of the plurality of powder guide ducts being directed at least approximately towards a point through which the laser beam passes; and a plurality of inert gas guide ducts each having a second outlet aperture, the second outlet apertures being directed at least roughly towards a second point through which the laser beam passes.

3. A nozzle according to claim 1, further comprising:

a plurality of guide ducts having second outlet apertures;

wherein the first and second outlet apertures are disposed in a circle around the laser duct outlet aperture.

4. A nozzle according to claim 2, in which the first and second outlet apertures have at least roughly a same angle with respect to a longitudinal axis of the laser duct.

5. A nozzle according to claim 2, wherein: a number of said plurality of inert gas ducts is approximately the same as a number of said plurality of powder guide ducts, the number of said plurality of inert gas ducts and the number of said plurality of powder guide ducts being between 4 and 40.

6. A nozzle for supplying powdery welding material into a working area of a laser beam of a powder welding installation, comprising:

a laser duct through which a laser beam passes, the laser duct having a longitudinal axis and a laser duct outlet aperture; and a plurality of powder guide ducts each having a first outlet aperture, the first outlet apertures of the plurality of powder guide ducts being directed at least approximately towards a point through which the laser beam passes, the outlet apertures having a cross section of between 0.1 mm$^2$ and 10 mm$^2$, and preferably from 0.6 mm$^2$ to 6 mm$^2$.

7. A nozzle for supplying powdery welding material into a working area of a laser beam of a powder welding installation, comprising:

a laser duct through which a laser beam passes, the laser duct having a longitudinal axis and a laser duct outlet aperture;

a plurality of powder guide ducts each having a first outlet aperture, the first outlet apertures of the plurality of powder guide ducts being directed at least approximately towards a point through which the laser beam passes; and a plurality of inert gas ducts each having a second outlet aperture, the second outlet apertures having a cross section of between 0.5 mm$^2$ and 10 mm$^2$.

8. A nozzle according to claim 2, wherein: at least one of said plurality of powder guide ducts and said plurality of inert guide ducts are connected to one or more connections.

9. A nozzle according to claim 1, wherein: the plurality of powder guide ducts are coupled to a distribution chamber.

10. A nozzle according to claim 1, in which an angle between the laser beam and the first outlet apertures of the plurality of powder guide ducts is between approximately 5° to approximately 50°.

11. A nozzle according to claim 1, having at least one cooling medium duct.

12. A nozzle for the surface treatment of metal workpieces, in particular for the powder build-up welding or thin-layer alloying of highly stressed metal components, which can be selectively connected to a mirror-focused or lens-focused high-energy beam installation, preferably a high-performance laser installation, by using the available cooling medium units, inert gas lines and powder conveyors/extractors, which contains means for positioning the stream of powder-delivery gas to the high-energy beam and to the inert gas shield, characterized in that the coupling of the nozzle to the high-energy beam installation is performed via the internal diameter, which is constant in the upper region, of its central laser beam guide part (1), the lower coinciding section of which is provided with a laser beam outlet aperture (18) and the upper flange-mounted annular part of which comprises cooling medium supply and discharge ducts (3), which lead into a water cooling chamber (2), which is formed firstly by the cylindrical and conical external contours of the laser beam guide part (1) and secondly by the internal contours of a powder guide cap (4), which are in the shape of a truncated cone, and in the tapered region at the end is sealed by means of tip-stretched sealing lips (13) and also in the region widened at the top is sealed by the screwed plug at the annular part connecting the laser beam guide part (1) and the powder guide cap (4), in that on the external peripheral surface of the powder guide cap (4) shaped like a truncated cone in the lower section a plurality of regularly distributed powder guide ducts (6) is incorporated, in that an inert gas guide cap (8) having internal contours adapted to the external contours of the powder guide cap (4) is also placed on the latter and attached thereto, in that above the powder guide ducts (6) is produced a clearance for the introduction and distribution of the stream of powder-delivery gas, but their conical surfaces in the region of the powder guide ducts (6) are pressed securely against one another and tightly seal said ducts on all sides right up to their outlet apertures (7), in that in addition on the external peripheral surface, shaped like a truncated cone, of the inert gas guide cap (8) are inserted several inert gas guide ducts (9), which are also regularly distributed, with upper clearances for the introduction of the stream of inert gas, which in turn are covered by means of an inert gas cap (10)—forming the outer end of the nozzle and detachably connected to the inert gas guide cap (8)—with adapted internal contours right up to its outlet apertures (11).

13. A laser coating installation having a nozzle according to claim 12.

14. A nozzle for supplying powdery welding material into a working area of a laser beam of a powder welding installation, comprising:

a laser duct through which a laser beam passes, the laser duct having a longitudinal axis and a tapered portion, the tapered portion having a larger end and smaller end, the smaller end lying in a first plane and the larger end lying in a second plane, the first and second planes being perpendicular to the longitudinal axis; and a plurality of powder guide ducts each having a first outlet aperture, the first outlet apertures being directed at least approximately towards a point through which the laser beam passes, the first outlet apertures being positioned closer to the first plane than to the second plane.

15. The nozzle according to claim 14 wherein:

the first outlet apertures are positioned substantially on the first plane.

16. A nozzle according to claim 1, further comprising:
a plurality of inert gas guide ducts each having a second outlet aperture, the second outlet apertures being directed at least roughly towards a second point through which the laser beam passes.

17. A nozzle according to claim 16, wherein:
the first and second outlet apertures have roughly a same angle with respect to a longitudinal axis of the laser duct.

18. A nozzle according to claim 16, wherein:
a number of said plurality of inert gas ducts is approximately the same as a number of said plurality of powder guide ducts, the number of said plurality of inert gas ducts and the number of said plurality of powder guide ducts being between 4 and 40.

19. A nozzle according to claim 1, wherein:
the first outlet apertures have a cross section of between 0.1 mm² and 10 mm², and preferably from 0.6 mm² to 6 mm².

20. A nozzle according to claim 1, further comprising:
a plurality of inert gas ducts each having a second outlet aperture, the second outlet apertures having a cross section of between 0.5 mm² and 10 mm².

21. A nozzle for supplying powdery welding material to a working area of a laser beam of a powder welding installation, the nozzle comprising:
a body having an end facing a working area and defining a laser beam duct having a longitudinal axis and terminating at the body end for directing the laser beam onto the working area, the body further including means defining an internal chamber for the powdery material;
means for supplying the internal chamber with the powdery material; and
a plurality of independent powder guide ducts extending from the chamber defining means at an oblique angle relative to the laser beam duct to first outlet apertures at the body end which are proximate to and spaced apart from a laser beam aperture and which convergingly direct the powdery material from the body toward a first point in approximate alignment with the longitudinal axis of the laser beam duct.

* * * * *